United States Patent
Cross (10) Patent No.: US 9,687,780 B2
(45) Date of Patent: Jun. 27, 2017

(54) SULPHUR DIOXIDE TREATMENT (71) Applicant: Le Gaz Integral SAS, Nanterre (FR)

(72) Inventor: Peter Frank Cross, Sussex (GB)

(73) Assignee: Le Gaz Integral SAS, Nanterre (FR)

( * ) Notice: Subject to any disclaimer, the term of this patent is extended or adjusted under 35 U.S.C. 154(b) by 45 days.

(21) Appl. No.: 14/409,088

(22) PCT Filed: Jun. 24, 2013

(86) PCT No.: PCT/GB2013/051662
§ 371 (c)(1),
(2) Date: Dec. 18, 2014

(87) PCT Pub. No.: WO2013/190335
PCT Pub. Date: Dec. 27, 2013

(65) Prior Publication Data
US 2015/0151245 A1 Jun. 4, 2015

(30) Foreign Application Priority Data

Jun. 22, 2012 (GB) .................................. 1211082.1
Jun. 22, 2012 (GB) .................................. 1211083.9
(Continued)

(51) Int. Cl.
*B01D 53/50* (2006.01)
*B01D 53/75* (2006.01)
(Continued)

(52) U.S. Cl.
CPC ......... *B01D 53/50* (2013.01); *B01D 53/1493* (2013.01); *B01D 53/507* (2013.01);
(Continued)

(58) Field of Classification Search
CPC .............. B01D 53/76; B01D 2257/302; B01D 2258/025; B01D 53/50; B01D 53/75;
(Continued)

(56) References Cited

U.S. PATENT DOCUMENTS 1,857,414 A * 5/1932 Thomsen ............... B01D 53/50
423/576.8
4,048,287 A * 9/1977 Kelleher ............... B01D 53/50
423/242.1
(Continued)

FOREIGN PATENT DOCUMENTS

DE 2 155 320 5/1973
EP 0270223 6/1988
(Continued)

OTHER PUBLICATIONS

International Search Report completed Oct. 21, 2013 for International Application No. PCT/GB2013/051662 entitled "Improved Sulphur Dioxide Treatment".
(Continued)

*Primary Examiner* — Timothy Vanoy
(74) *Attorney, Agent, or Firm* — Hamilton, Brook, Smith & Reynolds, P.C.

(57) ABSTRACT

A process for removing sulphur dioxide from the gaseous effluent of a smelter furnace comprising the steps of: providing the gaseous effluent from a smelter; separating the sulphur dioxide from the gaseous effluent to provide concentrated sulphur dioxide and effluent for discharge into the atmosphere; mixing the concentrated sulphur dioxide with a fuel gas; heating the mixture such that the concentrated sulphur dioxide and fuel gas react to form a gaseous product mixture comprising sulphur and hydrogen sulphide; and removing the majority of preferably substantially all of the sulphur and hydrogen sulphide from the gaseous product mixture; wherein the remaining gaseous product mixture is incinerated before being vented into the atmosphere or is recycled into the smelter furnace.

26 Claims, 2 Drawing Sheets (30) Foreign Application Priority Data

Aug. 2, 2012 (GB) .................................. 1213760.0
Aug. 2, 2012 (RU) ............................... 2012133249

(51) Int. Cl.

| | | |
|---|---|---|
| *B01D 53/76* | (2006.01) | |
| *C01B 17/04* | (2006.01) | |
| *C01B 17/60* | (2006.01) | |
| *C22B 5/02* | (2006.01) | |
| *C01B 17/16* | (2006.01) | |
| *B01D 53/14* | (2006.01) | |
| *F27D 17/00* | (2006.01) | |

(52) U.S. Cl.
CPC ............. *B01D 53/75* (2013.01); *B01D 53/76* (2013.01); *C01B 17/0404* (2013.01); *C01B 17/0408* (2013.01); *C01B 17/0478* (2013.01); *C01B 17/164* (2013.01); *C01B 17/60* (2013.01); *C22B 5/02* (2013.01); *F27D 17/001* (2013.01); *B01D 2251/208* (2013.01); *B01D 2257/302* (2013.01); *B01D 2258/025* (2013.01); *F27M 2001/01* (2013.01); *F27M 2001/02* (2013.01); *F27M 2003/13* (2013.01); *Y02C 20/20* (2013.01); *Y02P 10/146* (2015.11)

(58) Field of Classification Search
CPC ... B01D 53/507; C01B 17/0478; C01B 17/60; C22B 5/02; F27M 2001/01; F27M 2001/02; F27M 2003/13
See application file for complete search history.

(56) References Cited

U.S. PATENT DOCUMENTS

| | | | |
|---|---|---|---|
| 4,117,101 A | | 9/1978 | Fechner et al. |
| 4,171,348 A | * | 10/1979 | Bernales ............. C01B 17/0478 423/564 |
| 4,241,041 A | | 12/1980 | Farin |
| 4,552,746 A | | 11/1985 | Kettner |
| 5,514,351 A | | 5/1996 | Buchanan et al. |
| 5,798,088 A | | 8/1998 | Dorchak |
| 6,776,974 B1 | | 8/2004 | Burmaster |
| 8,425,874 B2 | * | 4/2013 | Rameshni ........... C01B 17/0404 423/573.1 |
| 2003/0103889 A1 | | 6/2003 | Mirsky |
| 2004/0076570 A1 | | 4/2004 | Jia |
| 2006/0254769 A1 | | 11/2006 | Wang |
| 2006/0288919 A1 | | 12/2006 | Rameshni |
| 2012/0321548 A1 | | 12/2012 | Rameshni |
| 2016/0059187 A1 | | 3/2016 | Cross |

FOREIGN PATENT DOCUMENTS

| | | |
|---|---|---|
| EP | 0 270 223 | 8/1988 |
| GB | 4 384 51 | 11/1935 |
| GB | 1 444 127 | 9/1973 |
| GB | 1 421 961 | 7/1976 |

OTHER PUBLICATIONS

Search Report for corresponding Great Britain application No. GB 1 213 760.0, "Improved Sulphur Dioxide Treatment", dated Nov. 29, 2012, 2 pages.

Search Report for corresponding Great Britain application No. GB 1 213 760.0, "Improved Sulphur Dioxide Treatment", dated May 28, 2013, 2 pages.

* cited by examiner

SULPHUR DIOXIDE TREATMENT

This application is the U.S. National Stage of International Application No. PCT/GB2013/051662, filed Jun. 24, 2013, which designates the U.S., published in English, and claims priority under 35 U.S.C. §§119 or 365(c) to Great Britain Application No. 1211082.1, filed Jun. 22, 2012, Great Britain Application No. 1211083.9 filed Jun. 22, 2012, Great Britain Application No. 1213760.0 filed Aug. 2, 2012 and Russia Application No. 2012133249 filed Aug. 2, 2012. The entire teachings of the above applications are incorporated herein by reference.

FIELD OF THE INVENTION

The present invention relates to a process for removing sulphur dioxide from the gaseous effluent of a smelter furnace and, in particular, to the thermal reduction to produce sulphur, a smelting process, effluent from a smelter furnace, and a smelter furnace.

BACKGROUND TO THE INVENTION

Sulphur dioxide is a typical by-product of industrial processes such as the smelting of sulphide ores or burning of sulphur containing fuels. If vented to the atmosphere without treatment, it can cause environmental problems such as acid rain.

The treatment of sulphur dioxide by thermal reduction to sulphur using methane, or a gas containing predominantly methane, such as natural gas, is known. However, in practice, such thermal reduction processes suffer from either soot formation or the need to add steam to the reaction mixture to avoid soot formation. In both scenarios, particularly the second, fuel consumption is high.

Furthermore, known implementations of the process have relatively low sulphur recovery efficiency, typically up to 95% based on sulphur dioxide in the feed compared with sulphur produced.

A way to ameliorate these problems has been sought.

SUMMARY OF THE INVENTION

Accordingly, in a first aspect, the invention provides a process for removing sulphur dioxide from the gaseous effluent of a smelter furnace, typically a furnace for smelting a sulphide ore, typically a sulphide ore smelting furnace, preferably, comprising the steps of:
  a. providing gaseous effluent from a smelter;
  b. separating the sulphur dioxide from the gaseous effluent to provide both concentrated sulphur dioxide and effluent for discharge into the atmosphere;
  c. mixing the concentrated sulphur dioxide with a fuel gas for reducing the sulphur dioxide;
  d. heating the resulting mixture such that the concentrated sulphur dioxide and fuel gas react to form a gaseous product mixture comprising sulphur and hydrogen sulphide; and
  e. removing the majority of, preferably substantially all of, the sulphur and hydrogen sulphide from the gaseous product mixture.

In a preferred embodiment, the remaining gaseous product mixture (i.e. the gaseous product mixture remaining once the sulphur and hydrogen sulphide is removed) is incinerated before being vented into the atmosphere. Typically, the concentrated sulphur dioxide and fuel gas are allowed sufficient time to react to form a gaseous product mixture comprising sulphur and hydrogen sulphide substantially without soot, preferably without soot. Experimental work has shown that a minimum residence time is required in the furnace to avoid soot in the combustion products. In a preferred embodiment, the residence time of the reactants in the furnace is from about 1 second to about 4 seconds, preferably from about 1.5 seconds to about 3 seconds.

In a preferred embodiment, the mixture of fuel gas and concentrated sulphur dioxide are heated in a furnace. Preferably, the mixture of fuel gas and concentrated sulphur dioxide enters said furnace premixed. Preferably, the mixture of fuel gas and concentrated sulphur dioxide enters the furnace through a burner, or burners, which only discharge fuel gas and concentrated sulphur dioxide as a mixture. The inventor has found that by pre-mixing the fuel gas and concentrated sulphur dioxide before it is heated, soot production is avoided with dry reactants or with a water content of less than 5%, preferably without needing to add any water vapour. Without being bound by theory, it is believed that if the concentrated sulphur dioxide and fuel gas enter the furnace separately then different reaction pathways are followed, leading to the production of soot. The present invention avoids such soot formation and, thereby, avoids fouling, for instance, of any catalyst beds used for sulphur and hydrogen sulphide removal.

Typically, the incinerator is heated by combustion of a fuel gas. Suitable fuel gases may be selected from the group consisting of methane, ethane, propane, hydrogen, carbon monoxide or mixtures thereof, or gases high in methane, such as natural gas. In a preferred embodiment, some, preferably the majority, more preferably at least about 65% (lower heating value), preferably from about 65% to about 90%, of the fuel values combusted in the incinerator is provided by the remaining gaseous product mixture.

In an embodiment, the remaining gaseous product mixture comprises sulphur species, typically other than sulphur and hydrogen sulphide, and is incinerated at a temperature sufficient to convert substantially all of the sulphur species to sulphur dioxide. Typically, the incinerator operates at a temperature of from about 600° C. to about 1000° C., preferably about 800° C.

In an embodiment the gaseous product mixture is cooled to enable the sulphur to be removed. Typically, the sulphur is a liquid when it is removed.

In a further embodiment of the invention, the hydrogen sulphide is removed from the gaseous product mixture using the Claus process. The Claus process is well known in the art. Typically, one, two, three, or more, Claus reactors are used. The more Claus reactors that are used, the better the recovery of sulphur from the process. Typically, the sulphur is removed in liquid form.

Typically, the fuel gas for reducing the sulphur dioxide comprises a hydrocarbon fuel, preferably methane, or gases high in methane, such as natural gas, or hydrogen, or carbon monoxide. In other embodiments, hydrogen sulphide may be used as the fuel gas.

In a preferred embodiment, the fuel gas for reducing the sulphur dioxide and concentrated sulphur dioxide are heated by combusting the fuel gas with oxygen. Typically, the fuel gas and concentrated sulphur dioxide are heated to a temperature of at least about 1000° C., preferably at least about 1100° C., more preferably at least about 1300° C., preferably from about 1000° C. to about 1500° C., preferably from about 1200° C. to about 1400° C.

Typically, the concentrated sulphur dioxide is produced by using an absorption and regeneration process. Typical absorption and regeneration processes include, but are not limited to, carbon bed, solvent and chemical base processes, including amine gas treatment. Such processes and equipment for performing sulphur dioxide absorption and regeneration process are known in the art.

Typically, the gaseous effluent from a smelter contains sulphur dioxide, typically in the range of 3% to 30% by volume. Typically, the effluent is cleaned of dust and cooled before introduction to the bottom of an absorber. The absorber is typically column containing packing or trays in which the gas is contacted with a counter-current flow of solvent. The solvent removes sulphur dioxide from the gas and leaves the bottom of the column as "rich" solvent containing dissolved sulphur dioxide. The "rich" solvent is transferred to a regenerator, or stripper, where, typically, heat is used to remove the sulphur dioxide from the solvent to produce a "lean" solvent, which is cooled and returned to the absorber. Typically the regenerator is a column containing packing or trays equipped with a reboiler at the bottom and condenser with a reflux system at the top. "Rich" solvent is introduced at or near the top of the column and flows down the column counter-current to vapours from the reboiler to produce "lean" solvent. Vapour from the top of the column is cooled and some liquid condensed and used as reflux. The remaining vapour is concentrated sulphur dioxide which is used in the process of invention.

In a preferred embodiment, the effluent for discharge into the atmosphere comprises less than about 4% by weight, more preferably less than 2% by weight, of the sulphur dioxide present in the gaseous effluent from the smelter, preferably less than about 1% by weight, preferably less than about 0.5% by weight. Preferably, only sulphur dioxide lost during the concentration step is let into the atmosphere. Typically, the effluent for discharge into the atmosphere is discharged into the atmosphere. Preferably, the concentrated sulphur dioxide comprises at least about 85%, preferably from about 85% to about 96%, by volume of sulphur dioxide.

In a second aspect, the present invention provides a process for removing sulphur dioxide from the gaseous effluent of a smelter furnace, typically a sulphide ore smelting furnace, preferably, comprising the steps of:
  a. providing the gaseous effluent from a smelter;
  b. separating the sulphur dioxide from the gaseous effluent to provide concentrated sulphur dioxide and effluent suitable for discharge into the atmosphere;
  c. mixing the concentrated sulphur dioxide with a fuel gas;
  d. heating the mixture such that the concentrated sulphur dioxide and fuel gas react to form a gaseous product mixture comprising sulphur and hydrogen sulphide;
  e. removing the majority of, preferably substantially all of, the sulphur and hydrogen sulphide from the gaseous product mixture;
wherein the remaining gaseous product mixture is recycled into the smelter furnace.

By recycling the remaining gaseous product mixture into the smelter furnace it has been found that fuel values in the remaining gaseous product mixture can be utilised and the overall sulphur recovery efficiency of the process increased. Typically, the concentrated sulphur dioxide and fuel gas are allowed sufficient time to react to form a gaseous product mixture comprising sulphur and hydrogen sulphide substantially without soot, preferably without soot. Experimental work has shown that a minimum residence time is required in the furnace to avoid soot in the combustion products. In a preferred embodiment, the residence time of the reactants in the furnace is from about 1 second to about 4 seconds, preferably from about 1.5 seconds to about 3 seconds.

In a preferred embodiment, the mixture of fuel gas and concentrated sulphur dioxide are heated in a furnace. Preferably, the mixture of fuel gas and concentrated sulphur dioxide enters said furnace premixed. Preferably, the mixture of fuel gas and concentrated sulphur dioxide enters the furnace through a burner, or burners, which only discharge fuel gas and concentrated sulphur dioxide as a mixture. The inventors have found that by pre-mixing the fuel gas and concentrated sulphur dioxide before it is heated, soot production is avoided with dry reactants or with a water content of less than 5%, preferably without needing to add any water vapour. Without being bound by theory, it is believed that if the concentrated sulphur dioxide and fuel gas enter the furnace separately then different reaction pathways are followed, leading to the production of soot. The present invention avoids such soot formation and, thereby, avoids fouling, for instance, of any catalyst beds used for sulphur and hydrogen sulphide removal.

In an embodiment, the fuel gasses present in the remaining gaseous product mixture which is recycled into the smelter furnace contributes at least about 5%, preferably at least about 10%, more preferably from about 10% to about 25% of the lower heating value of the fuel gasses provided to the sulphur dioxide reduction furnace.

In a preferred embodiment, the process further comprises the step of hydrogenating the remaining gaseous product mixture before it is recycled into the smelter furnace.

In a further embodiment, the process further comprises the step of quenching the hydrogenated gaseous product mixture before it is recycled into the smelter furnace.

Preferably, substantially all of the water from the hydrogenated gaseous product mixture is removed before it is recycled into the smelter furnace.

In an embodiment the gaseous product mixture is cooled to enable the sulphur to be removed. Typically, the sulphur is liquid when it is removed.

In a further embodiment of the invention, the hydrogen sulphide is removed from the gaseous product mixture using the Claus process. The Claus process is well known in the art. Typically, one, two, three, or more, Claus reactors are used. The more Claus reactors that are used, the better the recovery of sulphur from the process. Typically, the sulphur is removed in liquid form.

Typically, the fuel gas for reducing the sulphur dioxide comprises a hydrocarbon fuel, preferably methane, or gases high in methane, such as natural gas, or hydrogen, or carbon monoxide. Preferably, the molar ratio of sulphur dioxide to the carbon atoms in the fuel gas is such that substantially no soot is formed. Typically, the molar ratio of sulphur dioxide to the carbon atoms in the fuel gas is equal to or greater than 1:1. In other embodiments, hydrogen sulphide may be used as the fuel gas.

In a preferred embodiment, the fuel gas for reducing the sulphur dioxide and concentrated sulphur dioxide are heated by combusting the fuel gas with oxygen Typically, the fuel gas and concentrated sulphur dioxide are heated to a temperature of at least about 1000° C., preferably at least about 1100° C., more preferably at least about 1300° C., preferably from about 1200° C. to about 1400° C., preferably from about 1000° C. to about 1500° C.

Typically, the concentrated sulphur dioxide is produced by using an absorption and regeneration process. Typical absorption and regeneration processes include, but are not limited to, carbon bed, solvent and chemical base processes, including, but not limited to, amine gas treatment. As discussed above, such processes and equipment for performing sulphur dioxide absorption and regeneration process are known in the art.

In a preferred embodiment, the effluent for discharge into the atmosphere comprises less than about 4% by weight of the sulphur dioxide present in the gaseous effluent from the smelter, preferably less than about 1% by weight, preferably less than about 0.5% by weight. Preferably, only sulphur dioxide lost during the concentration step is let into the atmosphere. Typically, the effluent for discharge into the atmosphere is discharged into the atmosphere. Preferably, the concentrated sulphur dioxide comprises at least about 85%, preferably from about 85% to about 96%, by volume of sulphur dioxide.

In a third aspect, the present invention provides a metal ore smelting process comprising the steps of smelting the metal ore and producing a gaseous effluent comprising sulphur dioxide, wherein sulphur dioxide present in said gaseous effluent is removed using the process according to any of the preceding aspects or embodiments of the invention.

Effluent from a smelter furnace treated using the processes of any preceding aspects or embodiments of the invention.

Metal ores suitable for smelting in the above process are typically sulphide metal ores, and include ores of nickel, copper, zinc and lead.

The invention further provides a smelter, preferably for smelting a sulphide ore, comprising:
  a. a smelter furnace having a gaseous effluent outlet,
  b. means for collecting gaseous effluent from the gaseous effluent outlet;
  c. means for removing sulphur dioxide from the gaseous effluent so as to provide concentrated sulphur dioxide and an effluent suitable for discharge into the atmosphere;
  d. means for mixing the concentrated sulphur dioxide with a fuel gas;
  e. means for heating the mixture such that the concentrated sulphur dioxide and fuel gas react to form a gaseous product mixture comprising sulphur and hydrogen sulphide; and
  f. means for removing the sulphur and hydrogen sulphide from the gaseous product mixture;
characterised in that the smelter comprises means for recycling the remaining gaseous product mixture into the smelter furnace.

The invention further provides a smelter, preferably for smelting a sulphide ore, comprising:
  a. a smelter furnace having a gaseous effluent outlet,
  b. means for collecting gaseous effluent from the gaseous effluent outlet;
  c. means for removing sulphur dioxide from the gaseous effluent so as to provide concentrated sulphur dioxide and an effluent suitable for discharge into the atmosphere;
  d. means for mixing the concentrated sulphur dioxide with a fuel gas;
  e. means for heating the mixture such that the concentrated sulphur dioxide and fuel gas react to form a gaseous product mixture comprising sulphur and hydrogen sulphide; and
  f. means for removing the sulphur and hydrogen sulphide from the gaseous product mixture;
characterised in that the smelter further comprises an incinerator for incinerating the remaining gaseous product mixture.

In both smelter aspects, typically, the concentrated sulphur dioxide and fuel gas are allowed sufficient time to react to form a gaseous product mixture comprising sulphur and hydrogen sulphide substantially without soot, preferably without soot. In a preferred embodiment, the residence time of the reactants in the furnace is from about 1 second to about 4 seconds, preferably from about 1.5 seconds to about 3 seconds.

Advantages of the invention include that the remaining gaseous product mixture, and in particular the hydrogenated gaseous product mixture, can be used as fuel, for example, in the upstream combustion process (e.g. the smelter), resulting in fuel economy and no loss of sulphur (i.e. reduced sulphur dioxide emission to atmosphere because the sulphur dioxide is treated in the concentration system and not lost from the sulphur recovery process). Typically, if the gaseous product mixture is incinerated, the additional fuel requirements for the incinerator are reduced significantly.

DESCRIPTION OF THE DRAWINGS

The above-mentioned and other features and objects of this invention, and the manner of obtaining them, will become more apparent and the invention itself will be better understood by reference to the following description of embodiments of the invention taken in conjunction with the accompanying drawings, wherein.

Although the drawings represent exemplary embodiments of the present invention, the drawings are not necessarily to scale and certain features may be exaggerated to better illustrate and explain the invention. The exemplification set out herein illustrates exemplary embodiments of the invention only.

DETAILED DESCRIPTION OF THE INVENTION

The present invention provides a process for removing sulphur dioxide from the gaseous effluent of a smelter furnace, typically a sulphide ore smelting furnace, preferably, comprising the steps of:
  a. providing the gaseous effluent from a smelter;
  b. separating the sulphur dioxide from the gaseous effluent to provide concentrated sulphur dioxide and effluent suitable for discharge into the atmosphere;
  c. mixing the concentrated sulphur dioxide with a fuel gas;
  d. heating the mixture such that the concentrated sulphur dioxide and fuel gas react to form a gaseous product mixture comprising sulphur and hydrogen sulphide;
  e. removing the majority of, preferably substantially all of, the sulphur and hydrogen sulphide from the gaseous product mixture;
wherein the remaining gaseous product mixture is recycled into the smelter furnace, or incinerated before being vented into the atmosphere. Typically, the concentrated sulphur dioxide and fuel gas are allowed sufficient time to react to form a gaseous product mixture comprising sulphur and hydrogen sulphide substantially without soot, preferably without soot. In a preferred embodiment, the residence time of the reactants in the furnace is from about 1 second to about 4 seconds, preferably from about 1.5 seconds to about 3 seconds.

In some embodiments, the fuel gas and concentrated sulphur dioxide are heated to a temperature of at least about 1000° C., preferably at least about 1100° C., more preferably at least about 1300° C., preferably from 1000° C. to 1700° C., more preferably from about 1200° C. to about 1400° C., or from about 1100° C. or about 1200° C. to about 1500° C. or about 1400° C., especially a temperature of from 1200° C. to 1350° C. In some embodiments, step d is carried out in a refractory lined furnace. In some embodiments a portion of the concentrated sulphur dioxide-fuel gas mixture is introduced into the furnace with oxygen via a burner, whilst the remaining portion of the mixture of concentrated sulphur dioxide and fuel gas is injected into the furnace downstream of the burner. In some embodiments, the higher elevated temperature is a temperature of from 1350° C. to 1500° C. and the lower elevated temperature is a temperature of from 1150° C. to 1300° C.

In preferred embodiments the mixture of concentrated sulphur dioxide and fuel gas is at a pressure of from about 25 to 150 kPa, for example about 70 kPa, above atmospheric pressure. The advantage of using an elevated pressure is that the processed gases are available for further processing or recycle to the upstream combustion process without the need for compression.

In some embodiments the feed gases to the burner or furnace are not heated and the entire heat required for the process is provided by combustion of the of the fuel gas, e.g. methane rich fuel and oxygen. In other embodiments of the process the feed gases are heated. This has the advantage of leading to a reduction in the amount of fuel and oxygen needed to heat the furnace to the needed operating temperature.

In some embodiments the remaining gaseous product mixture (e.g. the tail gas from the Claus process) is incinerated and use is made of the fuel in the tail gas to reduce the fuel needs of the incinerator.

In some embodiments, the fuel rich stream from the hydrogenation/water removal process is used as fuel in a separate combustion process.

Hydrogen sulphide is preferably removed using the Claus process. Sulphur is preferably removed by cooling the gaseous product mixture.

In some embodiments intimate mixing of a concentrated sulphur dioxide stream from the concentration unit with a methane fuel (or a methane rich fuel gas such as natural gas) to form a gaseous mixture wherein the molar ratio of sulphur dioxide to the carbon atoms in the fuel gas is equal to or greater than 1:1 is used to avoid soot during the combustion process.

In some embodiments the use of fuel (hydrocarbon gas, or hydrogen or carbon monoxide) blended with sulphur dioxide avoids the very high temperatures associated with burning fuel with oxygen and so reduces the risk of equipment or refractory damage.

Figure 1:
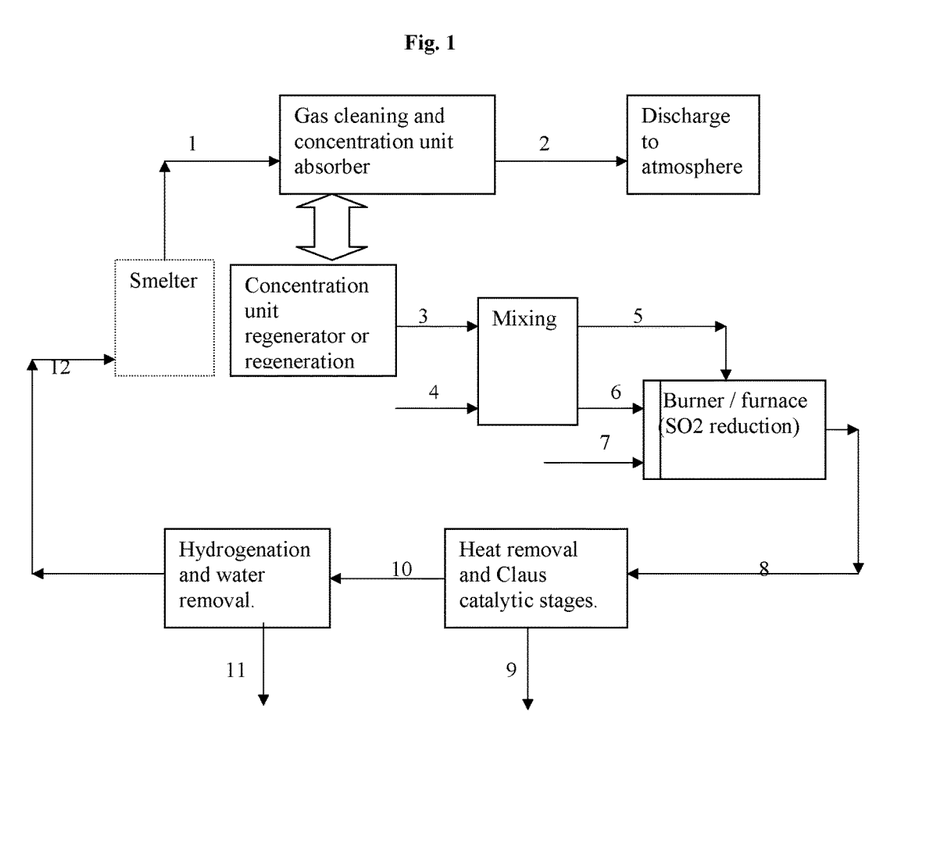
FIG. 1 is a schematic of the process according to the second aspect of the invention.

FIG. 1 shows a dilute sulphur dioxide stream (1) from a combustion process, such as a smelter. The dilute sulphur dioxide is processed (e.g. solvent treatment, carbon bed, chemical base treatment) in the concentrator unit to give a concentrated stream of sulphur dioxide (3) and a "cleaned" effluent suitable for discharge to atmosphere (2).

The concentrated sulphur dioxide (typically containing up to 95% by volume sulphur dioxide with water vapour and trace amounts of oxygen, nitrogen and carbon dioxide) is mixed with a fuel gas steam rich in methane, such as natural gas, such that the ratio of sulphur dioxide to carbon is 1:1 or greater based on atoms of carbon per molecule of sulphur dioxide. This ratio is to allow the following theoretical overall reaction between the methane and sulphur dioxide to occur:

$$SO_2+CH_4 = CO+H_2O+H_2+(1/xS_x)$$

The products of this reaction depend on the reaction temperature and will include hydrogen, carbonyl sulphide, carbon bisulphide, carbon monoxide, and carbon dioxide. Typically, there is sufficient oxygen present in the mixture to avoid soot formation.

The mixing the fuel gas with the sulphur dioxide stream is made possible by the use of the concentration process. Without the concentration process the sulphur dioxide stream can contain significant and variable amounts of oxygen, which could make mixing the stream with fuel gas potentially unsafe.

The mixed fuel and sulphur dioxide stream (6) is introduced as fuel to be burnt with oxygen in a burner which is attached to a refractory lined furnace, which provides residence time for the needed reactions. The oxygen stream (7) contains between about 50% and about 100% oxygen on a molar volume basis. Part of the mixed fuel and sulphur dioxide stream can be injected into the furnace downstream of the burner (stream 5) to allow flexibility in the burner operation.

The oxygen and methane (or other fuel gas) react to provide heat to raise the reaction temperature so that the thermal reaction between methane and sulphur dioxide can take place. Typically, the needed temperature is at least 1300° C., preferably from 1000° C. to 1500° C., more preferably from about 1200° C. to about 1400° C.

The refractory lined furnace residence time for the reactants is preferable from about 1 second to about 4 seconds, more preferably from about 1.5 seconds to about 3 seconds.

The overall reactions could be summarised by the simplified equations below:

$$2O_2+CH_4 = CO_2+2H_2O \quad \text{(heat producing reaction)}$$

$$CH_4+2SO_2 = CO_2+2H_2O+S_2 \quad \text{(sulphur forming reaction)}$$

$$4CH_4+6SO_2 = 4CO_2+4H_2O+4H_2S+S_2 \quad \text{(sulphur+hydrogen sulphide forming reaction)}$$

For a catalytic process these equations approximately describe the overall reactions, but for thermal systems observations of high temperature furnaces processing sulphur bearing gases and computer simulations of the disclosed process show significant amounts of carbon monoxide and hydrogen in the reaction products. These two gases can be used to advantage as they can be recycled to the upstream combustion process as fuel.

The gases from the furnace (8) pass to a heat removal system and one or more Claus catalyst stages which are operated in the conventional manner for such plant. The heat removal and Claus stages produce liquid sulphur (9). Tail gas from the Claus section (10) is passed to a hydrogenation reactor where all residual sulphur species are converted to hydrogen sulphide by reaction with the hydrogen and carbon monoxide contained in the tail gas. The main reactions occurring in the hydrogenation reactor are:

$$3H_2+SO_2 = H_2S+2H_2O$$

$$8H_2+S_8 = 8H_2S$$

$$CO+H_2O = CO_2+H_2.$$

For the disclosed process significant amounts of hydrogen remain in the process gases even after the hydrogenation reactions have taken place.

The gases from the hydrogenation reactor are then cooled, typically in a direct contact condenser against a counter-current stream of cooled water, and most of the water condensed and removed (11).

The remaining process gas contains fuel in the form of hydrogen, carbon monoxide and hydrogen sulphide (12) which is recycled to the upstream combustion process (a smelter in this case). The tail gas is burnt as fuel in the smelter and the hydrogen sulphide converted to sulphur dioxide and forms part of the smelter effluent stream (1), which is treated in the concentration unit.

Preferably, only the sulphur dioxide from the concentration system absorber is lost to the atmosphere. The fraction of sulphur dioxide lost varies with the type of absorber and concentration of sulphur dioxide in stream (1), but overall losses of 0.5% of the sulphur dioxide in the feed would be typical.

Figure 2:
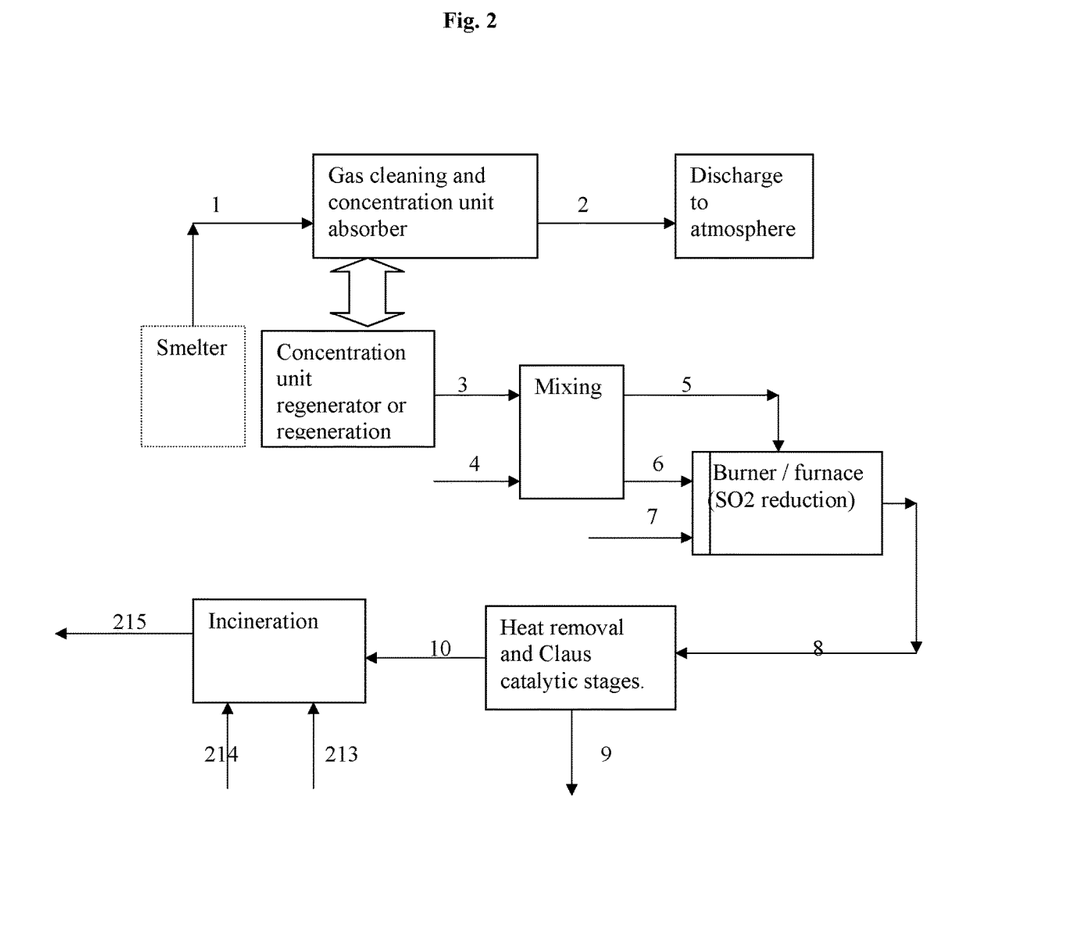
FIG. 2 is a schematic of the process according to the first aspect of the invention.

FIG. 2 shows the process according to the first aspect of the invention (i.e. the non-recycle process). The non-recycle process is similar to the recycle process except that the tail gases from the Claus section are incinerated and discharged to atmosphere and not hydrogenated and recycled.

The Claus reaction tail gas (10) is fed to a thermal incinerator. The incinerator typically operates at 800° C. with 3% free oxygen in the effluent in order to convert all sulphur species to sulphur dioxide before release to the atmosphere (215). The incinerator is heated by combustion of a fuel gas (213) with air (214).

The Claus reaction effluent for the disclosed process contains significant fuel values and very little additional fuel is needed to achieve the correct incineration conditions. This is in contrast with a catalytic process or a process using hydrogenation catalyst directly downstream of a thermal stage where there is little fuel value in the tail gas.

Examples

The following examples are based on processing a typical concentrated sulphur dioxide stream containing approximately 95% (molar) sulphur dioxide with a natural gas steam and oxygen stream containing approximately 90% (molar) oxygen.

For the heating process (step d) the feeds (except oxygen) are heated to 210° C., typically, by some of the steam generated in cooling the thermal stage (step e).

For the thermal processes the furnace outlet temperature calculated at thermodynamic equilibrium conditions is approximately 1300° C.

For cases where the Claus unit tail gas is incinerated the incineration is carried out at typical industrial conditions (approximately 800° C. with 3% free oxygen in the effluent).

Recycle Process.
Reactant flows in kgmol/hour.
Concentrated sulphur dioxide: 1 kgmol/h
Natural gas to process reactor=0.649 kgmol/h
Oxygen=0.276 kgmol/h The process gases (principally sulphur dioxide, hydrogen sulphide, sulphur, carbonyl sulphide, water vapour, hydrogen, carbon monoxide, carbon dioxide and nitrogen) from the furnace pass through (in this example) two Claus stages.

Tail gases from the Claus process pass to a hydrogenation reactor and the effluent from the hydrogenation reactor is cooled, typically by counter-current contact with a stream of water in a contact condenser column.

After the quench and water removal steps the flow of tail gas from the process is calculated as:

H2S=0.051 Kgmol/h

H2=0.167 kgmol/h

CO=0.004 kgmol/h

Balance=CO2,N2,H2O=0.766 kgmol/h.

The heating value of this gas is approximately 64.3 Mj/h, and it is recycled to the upstream process as fuel. This is equivalent to 0.085 kgmol/h of natural gas. (approximately 13% of the fuel value used in the sulphur dioxide reduction furnace)

The total equivalent natural gas used for the process is then 0.549 kgmol/h.

However, the recycle process must also handle the recycled gas and so the reactant volumes are to be increased by 5% to allow for the recycle flow, so the equivalent natural gas use is approximately (0.649−0.085)×1.05=0.592 kgmol/h.

The tail gas from the hydrogenation and quench system is recycled and the sulphur dioxide formed from the tail gasses in smelter is processed in the concentration unit. The sulphur dioxide losses from the sulphur recovery unit are then zero, so effectively the sulphur recovery efficiency of this unit is 100%.

Non-Recycle Process.
For this process example three Claus stages are used.
The reactant flows to the process reactor are the same as for the recycle process without the addition of the recycle flow. For this case the tail gas is incinerated and the fuel use (natural gas equivalent) for the incinerator is 0.029 kgmol/h, (this is a low value because the fuel values in the tail gas also act as fuel for the incinerator) making a total equivalent natural gas use of 0.678 kgmol/h.

The sulphur recovery efficiency of this sulphur recovery unit is then typical of a three stage Claus unit, and is calculated as 97.3%.

Comparison with Existing Processes
Thermal Process with Directly Following Hydrogenation Stage This process utilises the reducing gases (hydrogen and carbon monoxide) generated in the thermal stage to react with sulphur dioxide using a hydrogenation catalyst. After the hydrogenation stage the gases pass to Claus reactors (two in the given example) and then to an incinerator. This process allows reduced natural gas and oxygen to be used to achieve the reduction of sulphur dioxide, but requires more fuel for the incinerator as most of the carbon monoxide and hydrogen is used in the process before the incinerator.

For processing 1 kgmol/h of concentrated sulphur dioxide as above the oxygen and equivalent natural gas use is as follows:

Natural gas to process reactor=0.587 kgmol/h

Oxygen=0.258 kgmol/h

Fuel for incinerator (as natural gas)=0.111 kgmol/h

The recovery efficiency for the three reactor process (one hydrogenation plus two Claus) is calculated as 96.7%.

Catalytic Process

This process is theoretical for concentrated sulphur dioxide feeds because the very high temperature rise would mean the catalyst may no longer work. However the illustration below assumes that the catalyst can react one molar volume of sulphur dioxide with 0.5 molar volumes of methane (the theoretical minimum). The catalyst inlet temperature of 500° C. (typical for process) is achieved by heating the feeds using a fired heater and the tail gas from the process is incinerated.

For processing 1 kgmol/h of concentrated sulphur dioxide as above the oxygen and equivalent natural gas use is as follows:

Natural gas to process reactor=0.471 kgmol/h
Oxygen=0 kgmol/h
Fuel for feed heater (as natural gas)=0.04 kgmol/h
Fuel for incinerator (as natural gas)=0.116 kgmol/h The recovery efficiency is calculated as approximately 97%, on the basis of an "ideal" catalyst for the reaction of sulphur dioxide and natural gas.

The following table summarises the oxygen and equivalent natural gas use for each process expressed as a ratio with the disclosed recycle process. The overall sulphur recovery efficiency sulphur dioxide concentration unit and sulphur recovery unit is shown based on sulphur dioxide losses of 1.0% for the sulphur dioxide concentration unit.

Summary Table as Follows:

| Process | Total equivalent natural gas use | Oxygen use | Overall sulphur recovery efficiency | Comments |
|---|---|---|---|---|
| Disclosed recycle process | 1 | 1 | 99.0% | Includes 5% additional flow for recycle. |
| Disclosed non-recycle process | 1.15 | 0.95 | 96.3 | Oxygen flow is approximately 40% of the natural gas flow |
| Thermal process with hydrogenation directly following the thermal stage. | 1.18 | 0.89 | 95.7 | Oxygen flow is approximately 40% of the natural gas flow. |
| Theoretic "Ideal" catalytic process | 1.06 | 0 | 96.0? | Air used for fired heater. May not be a practical process. |

The disclosed recycle process has the lowest energy use of all the processes when fuel for the incinerator is considered. The disclosed non-recycle process has a slightly lower energy use than alternative thermal process. The "ideal" catalytic process has a greater fuel use than the disclosed recycle process and approximately 8% less fuel use than the non-recycle process.

The sulphur recovery efficiency of the recycle process is set by the performance of the concentration unit absorber. Typically, the sulphur dioxide capture efficiency of such units is above 99% and this is the same as the overall sulphur recovery efficiency of the disclosed recycle process. Sulphur recovery units are well known in the art.

The sulphur recovery efficiency of the disclosed non-recycle processes is typical for a three stage Claus unit, i.e. 97%, and the losses from the sulphur dioxide concentration unit are additional to this, making the overall sulphur recovery efficiency approximately 96%. This is greater than the alternative thermal/hydrogenation process.

The sulphur recovery efficiency of the non-recycle process can be increased, such as by adding a tail gas treatment unit or removing $SO_2$ from the incinerator effluent. These processes require additional equipment and the overall sulphur recovery efficiency must always be less than that set by the $SO_2$ capture efficiency of the concentration unit. The catalytic process or the process using a hydrogenation catalyst directly after the thermal stage would require additional reducing gases if a conventional amine based tail gas treatment unit was to be used.

The processes of the invention (both recycle and non-recycle) use process conditions, equipment, catalyst and techniques as used in industrial Claus units worldwide and many hundreds of years of accumulated operating experience exists for such plants. Typical operating run lengths between maintenance shutdowns for these plants are 3 to 4 years. The commercial application of the alternative processes is far less frequent than the Claus process and when using special catalysts more frequent maintenance shutdowns would be expected.

It will be appreciated by those skilled in the art that the foregoing is a description of a preferred embodiment of the present invention and that variations in design and construction may be made to the preferred embodiment without departing from the scope of the invention as defined by the appended claims.

What is claimed:

1. A process for removing sulphur dioxide from the gaseous effluent of a smelter furnace comprising the steps of:
    a) providing the gaseous effluent from a smelter;
    b) separating the sulphur dioxide from the gaseous effluent to provide concentrated sulphur dioxide and effluent for discharge into the atmosphere;
    c) mixing the concentrated sulphur dioxide with a fuel gas to form a fuel gas-sulphur dioxide mixture;
    d) heating the fuel gas-sulphur dioxide mixture by combusting fuel gas in the fuel gas-sulphur dioxide mixture with oxygen such that the concentrated sulphur dioxide and fuel gas react to form a gaseous product mixture comprising sulphur and hydrogen sulphide; and
    e) removing the majority of the sulphur and hydrogen sulphide from the gaseous product mixture; characterised in that the remaining gaseous product mixture is incinerated in an incinerator before being vented into the atmosphere.

2. The process according to claim 1 wherein the incinerator is heated by combustion of a fuel gas.

3. The process according to claim 2 wherein at least about 65% of the fuel value needed for the incinerator is provided by the remaining gaseous product mixture.

4. The process according to claim 1 wherein the remaining gaseous product mixture comprises sulphur species and is incinerated at a temperature sufficient to convert substantially all of the sulphur species to sulphur dioxide.

5. The process according to claim 1 wherein the incinerator operates at a temperature of from about 600° C. to about 1000° C.

6. A process for removing sulphur dioxide from the gaseous effluent of a smelter furnace comprising the steps of:
    a) providing the gaseous effluent from a smelter;
    b) separating the sulphur dioxide from the gaseous effluent to provide concentrated sulphur dioxide and effluent suitable for discharge into the atmosphere;
    c) mixing the concentrated sulphur dioxide with a fuel gas to form a fuel gas-sulphur dioxide mixture;
    d) heating the fuel gas-sulphur dioxide mixture by combusting fuel gas in the fuel gas-sulphur dioxide mixture with oxygen such that the concentrated sulphur dioxide and fuel gas react to form a gaseous product mixture comprising sulphur and hydrogen sulphide;

e) removing the majority of the sulphur and hydrogen sulphide from the gaseous product mixture; characterised in that the remaining gaseous product mixture is recycled into the smelter furnace.

7. The process according to claim 6 further comprising the step of hydrogenating the remaining gaseous product mixture before it is recycled into the smelter furnace.

8. The process according to claim 7 further comprising the step of quenching the hydrogenated gaseous product mixture before it is recycled into the smelter furnace.

9. The process according to claim 7 further comprising the step of removing substantially all of the water from the hydrogenated gaseous product mixture before it is recycled into the smelter furnace.

10. The process according to claim 6 wherein the remaining gaseous product mixture which is recycled into the smelter furnace comprises fuel gas.

11. The process according to claim 10 wherein the fuel gas in the remaining gaseous product mixture which is recycled into the smelter furnace contributes at least about 5% of the lower heating value of the fuel gasses provided to the sulphur dioxide reduction furnace.

12. The process according to claim 6 wherein the hydrogen sulphide is removed from the gaseous product mixture using the Claus process.

13. The process according to claim 6 wherein the gaseous product mixture is cooled to enable the sulphur to be removed.

14. The process according to claim 13 wherein the sulphur is a liquid when it is removed.

15. The process according to claim 6 wherein the fuel gas is a hydrocarbon fuel.

16. The process according to claim 6 wherein the fuel gas-sulphur dioxide mixture is heated to a temperature of at least about 1000° C.

17. The process according to claim 6 wherein the fuel gas-sulphur dioxide mixture is heated in a furnace and wherein the residence time for the reactants in the furnace is from about 1 second to about 4 seconds.

18. The process according to claim 6 wherein effluent suitable for discharge into the atmosphere comprises less than 4% by weight of the sulphur dioxide present in the gaseous effluent from the smelter.

19. The process according to claim 6 wherein only sulphur dioxide lost during the concentration step is let into the atmosphere.

20. The process according to claim 6 wherein the concentrated sulphur dioxide is produced by using an absorption and regeneration process.

21. The process according to claim 6 wherein the concentrated sulphur dioxide comprises at least about 85% by volume sulphur dioxide.

22. The process according to claim 6 wherein the concentrated sulphur dioxide is produced using solvent gas treatment.

23. A metal ore smelting process comprising the steps of smelting the metal ore wherein the process produces a gaseous effluent and wherein sulphur dioxide present in said gaseous effluent is removed using the process according to claim 6.

24. Effluent from a smelter furnace treated according to claim 1.

25. A smelter comprising:
a) a smelter furnace having a gaseous effluent outlet,
b) means for collecting gaseous effluent from the gaseous effluent outlet;
c) means for removing sulphur dioxide from the gaseous effluent so as to provide concentrated sulphur dioxide and an effluent suitable for discharge into the atmosphere;
d) means for mixing the concentrated sulphur dioxide with a fuel gas to form a fuel gas-sulphur dioxide mixture;
e) means for heating the fuel gas-sulphur dioxide mixture by combusting fuel gas in the fuel gas-sulphur dioxide mixture with oxygen such that the concentrated sulphur dioxide and fuel gas react to form a gaseous product mixture comprising sulphur and hydrogen sulphide; and
f) means for removing the sulphur and hydrogen sulphide from the gaseous product mixture;
characterised in that the smelter comprises means for recycling the remaining gaseous product mixture into the smelter furnace.

26. A smelter comprising:
a) a smelter furnace having a gaseous effluent outlet,
b) means for collecting gaseous effluent from the gaseous effluent outlet;
c) means for removing sulphur dioxide from the gaseous effluent so as to provide concentrated sulphur dioxide and an effluent suitable for discharge into the atmosphere;
d) means for mixing the concentrated sulphur dioxide with a fuel gas to form a fuel gas-sulphur dioxide mixture;
e) means for heating the fuel gas-sulphur dioxide mixture by combusting fuel gas in the fuel gas-sulphur dioxide mixture with oxygen such that the concentrated sulphur dioxide and fuel gas react to form a gaseous product mixture comprising sulphur and hydrogen sulphide; and
f) means for removing the sulphur and hydrogen sulphide from the gaseous product mixture;
characterised in that the smelter further comprises an incinerator for incinerating the remaining gaseous product mixture.

* * * * *